(12) United States Patent
Zheng et al.

(10) Patent No.: US 8,553,177 B2
(45) Date of Patent: Oct. 8, 2013

(54) LIGHT GUIDE PLATE, BACKLIGHT AND LCD DEVICE

(75) Inventors: Xiaopan Zheng, Beijing (CN); Haikuo Gao, Beijing (CN); Daekeun Yoon, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 13/273,867

(22) Filed: Oct. 14, 2011

(65) Prior Publication Data
US 2012/0092591 A1 Apr. 19, 2012

(30) Foreign Application Priority Data

Oct. 15, 2010 (CN) .................... 2010 2 0574623 U

(51) Int. Cl.
*G02F 1/1335* (2006.01)
(52) U.S. Cl.
USPC ............. 349/65; 349/56; 349/61; 349/62; 349/64; 349/67; 362/600; 362/611; 362/612; 362/615

(58) Field of Classification Search
USPC ............ 349/56, 61, 62, 64, 65, 67; 362/600, 362/611, 612, 615
See application file for complete search history.

(56) References Cited

U.S. PATENT DOCUMENTS

| 7,108,416 B1* | 9/2006 | Osawa .......................... 362/618 |
| 2006/0139960 A1* | 6/2006 | Sakai et al. .................. 362/623 |
| 2011/0013123 A1* | 1/2011 | Park et al. ...................... 349/96 |
| 2011/0134369 A1* | 6/2011 | Song et al. ..................... 349/65 |

FOREIGN PATENT DOCUMENTS

JP 2006208582 A * 8/2006

* cited by examiner

*Primary Examiner* — Jennifer Doan
(74) *Attorney, Agent, or Firm* — Ladas & Parry LLP

(57) ABSTRACT

A light guide plate comprising an incidence surface, a lower surface, an upper surface and an opposite surface which is opposite to the incidence surface, wherein the length of the upper surface is less than the length of the lower surface, and an acute angle is formed between the opposite surface and the direction of elongation line of the upper surface.

11 Claims, 3 Drawing Sheets

US 8,553,177 B2

LIGHT GUIDE PLATE, BACKLIGHT AND LCD DEVICE

BACKGROUND

Embodiments of the disclosed technology relate to a light guide plate, a backlight and a liquid crystal display device.

A light guide plate, which is a main component for converting a point light source or a line light source into a surface light source in a backlight module, can be used in a flat panel display, such as a liquid crystal display TV, a notebook, a digital camera, a monitor, or a projector. The light guide plate provides a surface light source output with uniform luminance, so that the flat panel display is able to display correctly. Light emitting diodes (LEDs) are increasingly used as the light sources in a backlight.

FIG. 1 is a structural schematic view showing a conventional light guide plate and a backlight using the same. As shown in FIG. 1, light emitted from a light source 1 is incident on an incident surface 21 of a light guide plate 2 and travels along the optical paths within the light guide plate 2. After reflected by a reflective film 3 under the bottom surface 22 of the light guide plate 2, the light then exits from the upper surface 23 of the light guide plate 2 in optical paths. The light finally vertically exits from the display panel after acted on by other components in the optical module. However, parts of the light exits from an opposite surface 24 to the incidence surface 21. Since the light source is provided on one side of the light guide plate, a considerable portion of the light vertically exits from the opposite surface (not shown). The light exiting from the opposite surface is incident on and reflected by the frame 4 surrounding the outside of opposite surface 24 and then is emitted from the display panel 5. As a result, light leakage occurs at a certain angle of vision. Therefore, there is a problem of light leakage with the light guide plate.

SUMMARY

An embodiment of the disclosed technology provides a light guide plate comprising an incidence surface, a lower surface, an upper surface and an opposite surface which is opposite to the incidence surface, wherein the length of the upper surface is less than the length of the lower surface, and an acute angle is formed between the opposite surface and the direction of elongation line of the upper surface.

Another embodiment of the disclosed technology provides a backlight comprising a light guide plate described above.

Further another embodiment of the disclosed technology provides a liquid crystal display device comprising a liquid crystal panel and the light source described above.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Hereinafter, embodiments will be described in detail with reference to the accompanying drawings so that the objects, technical solutions and advantages of the embodiments will become more apparent. It should be noted that the embodiments described below are merely a portion of but not all of the embodiments of the disclosed technology, and thus various modifications, combinations or alterations can be made on the basis of the described embodiments without departing from the spirit and scope of the disclosed technology.

Embodiments of the disclosed technology provide a light guide plate, a backlight and a liquid crystal display so as to alter the optical paths of the exit light from the opposite surface with regard to the incident surface and suppress the light leakage thus caused.

Hereinafter, the guide light plate, the backlight and the liquid crystal display device will be described in detail referring to the accompanying drawings.

First Embodiment

Figure 1:
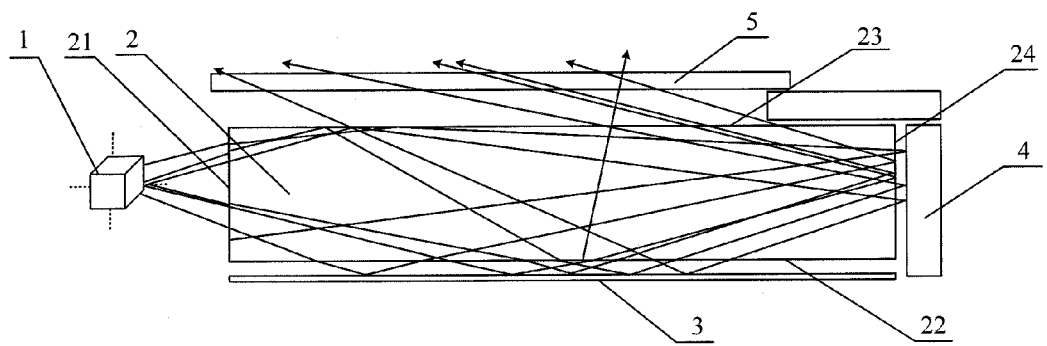
FIG. 1 is a conventional structural schematic view showing a light guide plate and a backlight.
Figure 2:
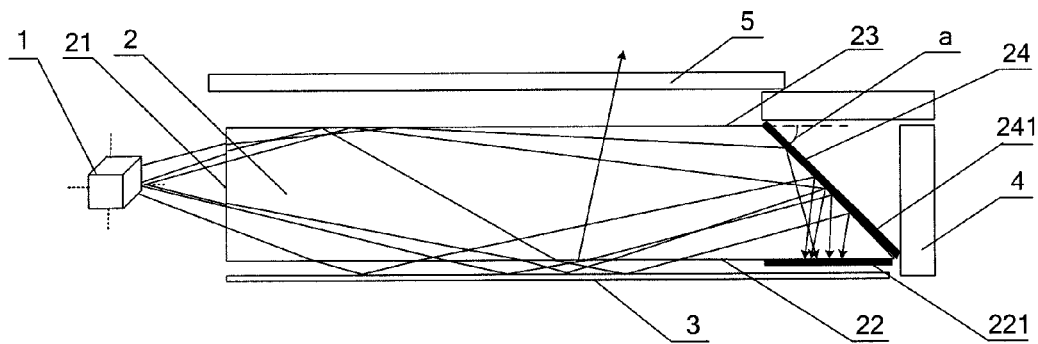
FIG. 2 is a structural schematic view showing a light guide plate and a backlight according to a first embodiment of the disclosed technology.

The embodiment of the disclosed technology provides a light guide plate 2, as shown in FIG. 2. The light guide plate 2 comprises an incidence surface 21, a lower surface 22, an upper surface 23 and an opposite surface 24 to the incidence surface 21. In the cross-sectional view, the length of the upper surface 23 is less than that of the lower surface 22, and an acute angle "a" is formed between the opposite surface 24 and the direction of the elongation line of the upper surface 23.

In particular, the light guide plate 2 as shown in FIG. 2 is a flat light guide plate 2, the opposite surface 24 is in a slope surface in this embodiment, and the angle "a" is an acute angle, and preferably 45°, i.e., the angle between the opposite surface 24 and the lower surface 22 is 45° so as to form a structure of isosceles triangle, as shown in FIG. 2. The light emitted from the light source 1 is incident on the incidence surface 21 of the light guide plate 2 and travels along the optical paths within the light guide plate 2. After reflected by the light reflecting layer 3 under the lower surface 22 of the light guide plate 2, the light exits from the upper surface 23 of the light guide plate 2 along the optical paths. The light finally vertically exits from the display panel 5 after influenced by other optical components in the optical module, and a part of the light exits from the opposite surface 24 to the incidence surface 21. Due to the reflection effect, the light is reflected into the light guide plate 2 at the opposite surface 24 along the directions of arrows for example shown in the drawing. In this way, the part of light which could have exited from the opposite surface 24 in the prior art will not exit from the display panel 5. Therefore, the light leakage caused by the part of light can be avoided.

Further, a first reflecting layer 241 may be provided on the opposite surface 24, and/or a second reflecting layer 221 may be further provided in a projection region of the opposite surface 24 on the lower surface 22 to reflect the portion of the light into the light guide plate 2 again, so that the light leakage can be further reduced. Furthermore, the first reflecting layer 241 and the second reflecting layer 221 which may be light absorbable, for example, can be formed of a light absorption material or be implemented in another way. In this case, the portion of the light is partially absorbed when reflected into the light guide plate 2, so that the occurrence of light leakage is further suppressed. The material of the first reflecting layer 241 and/or the second reflecting layer 221 may be a reflecting adhesive tape with superior reflectivity and good adhesive property; besides, a sandblasting treatment can be performed on the opposite surface 24 and/or in the projection region of the opposite surface 24 on the lower surface 22 to form a sandblasting layer, so that the exit light is further reflected into the light guide plate and the less part of the light exits from the display panel 5.

In this embodiment, the opposite surface 24 which is opposite to the incidence surface 21 of the light guide plate 2 is provided as a slope surface with an acute angle formed between the slope surface and the direction of elongation line of the upper surface 23 of the light guide plate 2. Thus, the optical paths of the exit light from the opposite surface 24 with regard to the incidence surface 21 of the light guide plate 2 are altered. Due to the refraction and the reflection happened on the opposite surface 24, a portion of the light which could have exited from the opposite surface 24 in the prior art is reflected by the opposite surface 24 towards the lower surface 22 of the light guide plate 2, so that the portion of light which could have exited from the opposite surface 24 in the prior art will not exit from the display panel 5. Thus, the light leakage caused by the portion of light is avoided.

Second Embodiment

Figure 3:
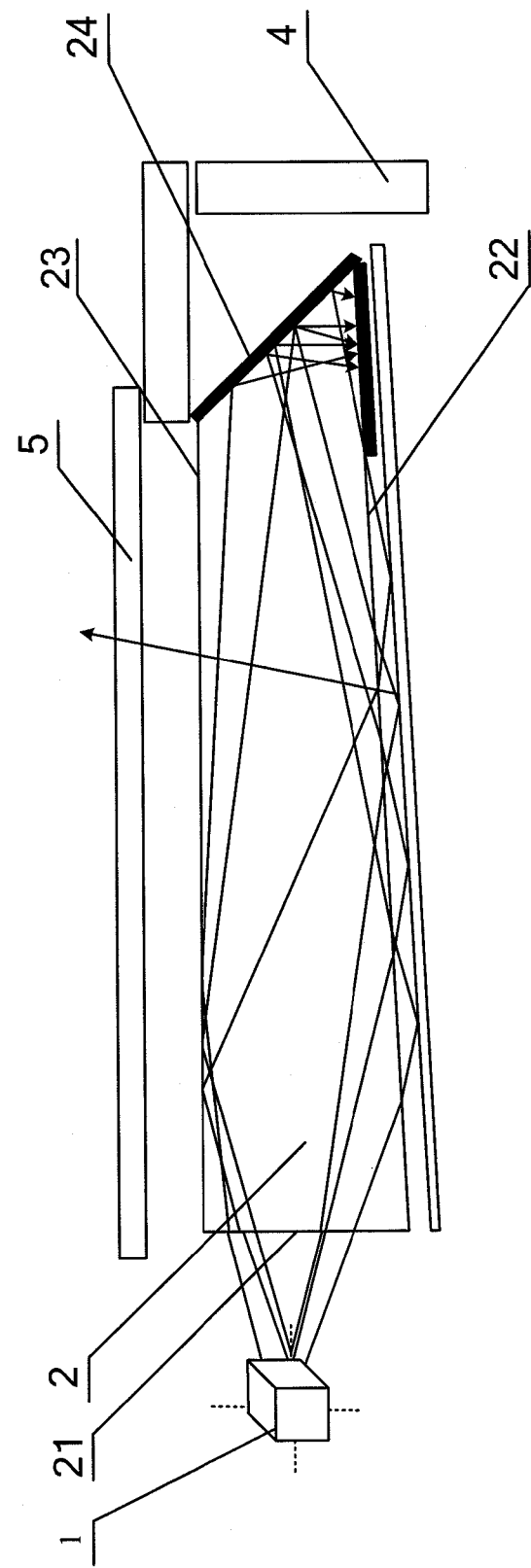
FIG. 3 is a structural schematic view showing a light guide plate and a backlight according to a second embodiment of the disclosed technology.

The light guide plate 2 according to this embodiment of the disclosed technology is substantially the same as the light guide plate of the first embodiment except that the light guide plate 2 is in a wedge shape as shown in FIG. 3. Also, the opposite surface 24 is formed as a slope surface. The specific structure of the slope surface can be found with reference to the first embodiment, and so is not described herein for simplicity. Due to the reflection happened on the opposite surface 24, a portion of the light which could have exited from the opposite surface 24 in the prior art is reflected by the opposite surface 24 towards the lower surface 22 of the light guide plate 2, so that the portion of light which could have exited from the opposite surface 24 in the prior art will not exit from the display panel 5. Thus, the light leakage caused by the portion of light is avoided.

Third Embodiment

Figure 4:
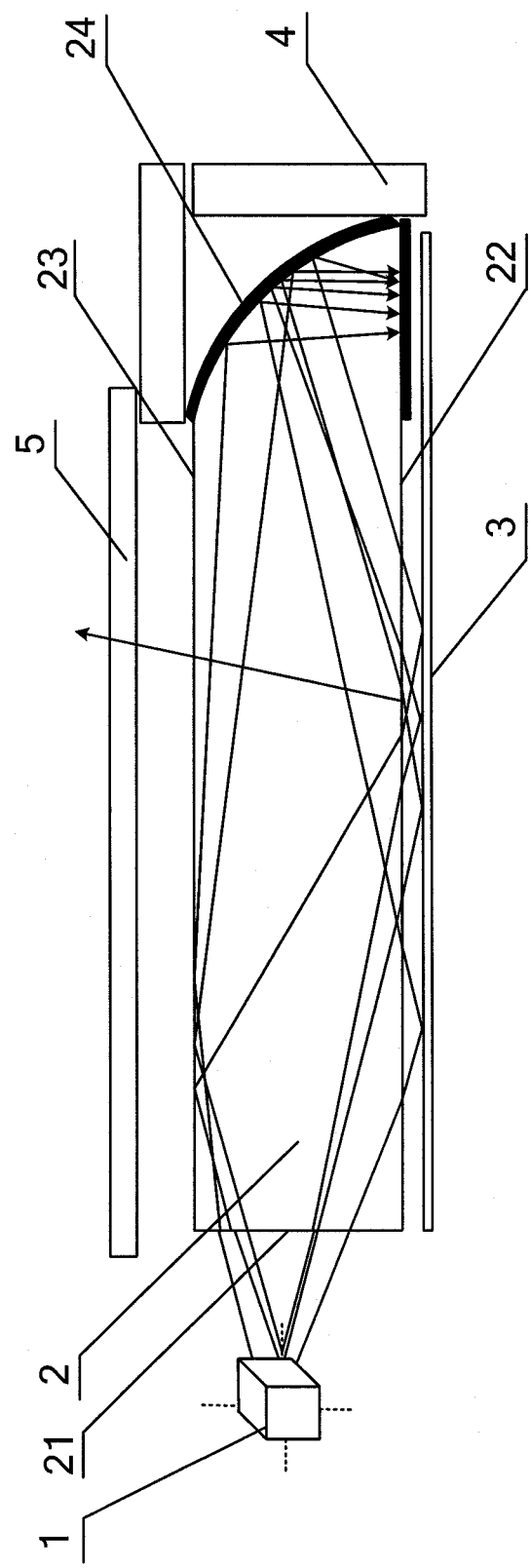
FIG. 4 is a structural schematic view showing a light guide plate and a backlight according to a third embodiment of the disclosed technology.

The light guide plate 2 according to this embodiment of the disclosed technology is substantially the same as anyone of the foregoing embodiments except that the opposite surface 24 is provided as a cambered surface, preferably a semicircular surface, as shown in FIG. 4. Also, due to the reflection happened on the opposite surface 24, a portion of the light which could have exited from the opposite surface 24 in the prior art is reflected by the opposite surface 24 towards the lower surface 22 of the light guide plate 2, so that the portion of the light which could have exited from the opposite surface 24 in the prior art will not exit from the display panel 5. Thus, the light leakage caused by the portion of light is avoided.

Similarly, a first reflecting layer 241 may be provided on the cambered opposite surface 24, and/or a second reflecting layer 221 may be further provided in a projection region of the opposite surface 24 on the lower surface 22, so as to further reduce the exit light and decrease occurrence of light leakage. The material of the first reflecting layer 241 and/or the second reflecting layer 221 may be a reflecting adhesive tape with superior reflectivity and good adhesive property; besides, a sandblasting treatment can be performed on the opposite surface 24 and/or in the projection region of the opposite surface 24 on the lower surface 22 to form a sandblasting region, so that the exit light is further reflected into the light guide plate and the exit light is reduced further.

Fourth Embodiment

The embodiment of the disclosed technology provides a backlight, as shown in FIG. 2, the backlight comprising a light source 1, a light guide plate 2 and the optical module thereof. The light guide plate 2 comprises an incidence surface 21, a lower surface 22, an upper surface 23 and an opposite surface 24 to the incidence surface 21. In the cross-sectional view, the length of the upper surface 23 is less than the length of the lower surface 22, and an acute angle "a" is formed between the opposite surface 24 and the direction of elongation line of the upper surface 23. The light source 1 is a side light source.

Further, the opposite surface 24 of the light guide plate 2 can be provided as a slope surface or a cambered surface, and the cambered surface is preferably a semicircular surface.

It is noted that the structure of the light guide plate 2 in this embodiment is embodied in anyone of the structures of the light guide plates in the foregoing embodiments so that the related description is omitted.

In this embodiment, the opposite surface 24 to the incidence surface 21 of the light guide plate 2 is provided as a slope surface. An acute angle is formed between the slope surface and the direction of the elongation line of the upper surface 23 of the light guide plate 2. Therefore, the optical paths of the light emitted from the opposite surface 24 with regard to the incidence surface 21 of the light guide plate 2 are altered. Due to the reflection happened on the opposite surface 24, a portion of the light which could have exited from the opposite surface 24 in the prior art is reflected by the opposite surface 24 towards the lower surface 22 of the light guide plate 2, so that the portion of light which could have exited from the opposite surface 24 in the prior art will not exit from the display panel 5. Thus, the light leakage caused by the portion of light is avoided.

Fifth Embodiment

The fifth embodiment of the disclosed technology provides a liquid crystal display device, wherein the backlight used is one of the foregoing backlight.

Certainly, the liquid crystal display device in this embodiment can further comprises some components in the liquid crystal display device, such as a liquid crystal panel, polarizing films, a frame structure and the like. The backlight is provided under the liquid crystal panel to irradiate the liquid crystal panel. The liquid crystal display device in this embodiment may be that for a monitor, a mobile phone, a laptop computer, a liquid crystal TV set, a digital photo album and etc.

Since the liquid crystal display device of this embodiment adopts the foregoing backlight, the light leakage happened on the upper surface of the light guide plate is suppressed. Therefore, the display quality of the liquid crystal display device which adopts the foregoing backlight is enhanced.

In addition to be used in the backlight of the liquid crystal display device, the light guide plate can also be used in many other fields, for example a lamp, an instrument panel, an indicator, a projector and so on.

The disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. A light guide plate comprising:
an incidence surface,
a lower surface,
an upper surface, and
an opposite surface which is opposite to the incidence surface,
wherein the length of the upper surface is less than the length of the lower surface, and an acute angle is formed between the opposite surface and the direction of elongation line of the upper surface.

2. The light guide plate according to claim 1, wherein the opposite surface is a slope surface.

3. The light guide plate according to claim 1, wherein the opposite surface is a cambered surface.

4. The light guide plate according to claim 1, wherein the acute angle is of 45°.

5. The light guide plate according to claim 1, wherein a first reflecting layer is provided on the opposite surface.

6. The light guide plate according to claim 5, wherein a second reflecting layer is provided on the lower surface in the projection region of the opposite surface.

7. The light guide plate according to claim 6, wherein the material of the first reflecting layer and/or the second reflecting layer is a reflecting tape.

8. The light guide plate according to claim 6, wherein the first reflecting layer and/or the second reflecting layer is a sandblast-treated layer.

9. The light guide plate according to claim 6, wherein the first reflecting layer and/or the second reflecting layer is light absorbable.

10. A backlight comprising a light guide plate according to claim 1.

11. A liquid crystal display device comprising:
a liquid crystal panel; and
the light source according to claim 10.

* * * * *